(12) United States Patent
Fujie et al.

(10) Patent No.: US 12,480,240 B2
(45) Date of Patent: Nov. 25, 2025

(54) SEWING SYSTEM

(71) Applicant: JUKI CORPORATION, Tama (JP)

(72) Inventors: Kimiko Fujie, Tokyo (JP); Takeshi Asami, Tokyo (JP)

(73) Assignee: JUKI CORPORATION, Tama (JP)

( * ) Notice: Subject to any disclaimer, the term of this patent is extended or adjusted under 35 U.S.C. 154(b) by 0 days.

(21) Appl. No.: 18/519,514

(22) Filed: Nov. 27, 2023

(65) Prior Publication Data
US 2024/0175179 A1    May 30, 2024

(30) Foreign Application Priority Data
Nov. 28, 2022  (JP) ................. 2022-189424

(51) Int. Cl.
| | | |
|---|---|---|
| *D05B 19/12* | (2006.01) | |
| *B25J 9/16* | (2006.01) | |
| *B25J 11/00* | (2006.01) | |
| *D05B 19/04* | (2006.01) | |
| *D05B 27/00* | (2006.01) | |
| *D05B 35/08* | (2006.01) | |
| *D05B 35/12* | (2006.01) | |
| *D05B 81/00* | (2006.01) | |

(52) U.S. Cl.
CPC ............ *D05B 19/12* (2013.01); *B25J 9/1682* (2013.01); *B25J 9/1697* (2013.01); *B25J 11/005* (2013.01); *D05B 19/04* (2013.01); *D05B 27/00* (2013.01); *D05B 35/08* (2013.01); *D05B 35/12* (2013.01); *D05B 81/00* (2013.01); *D05D 2305/02* (2013.01)

(58) Field of Classification Search
CPC ........ D05B 19/12; D05B 27/00; D05B 35/08; D05B 35/12; D05B 81/00; D05B 2305/02; B25J 9/1682; B25J 9/1697; B25J 11/005
See application file for complete search history.

(56) References Cited

U.S. PATENT DOCUMENTS

| | | | | |
|---|---|---|---|---|
| 5,381,743 | A * | 1/1995 | Moll ...................... | D05B 23/00 112/470.13 |
| 6,129,031 | A * | 10/2000 | Sarh ....................... | D05B 25/00 901/41 |
| 9,681,709 | B2 * | 6/2017 | Manz ................... | A43B 23/0235 |
| 2008/0011313 | A1 * | 1/2008 | Gildenberg ........... | A41G 3/0075 901/41 |
| 2018/0044830 | A1 * | 2/2018 | Kadowaki .............. | D05B 69/00 |
| 2018/0153627 | A1 * | 6/2018 | Remm .................... | A61B 34/71 |
| 2019/0353476 | A1 | 11/2019 | Takeda | |

FOREIGN PATENT DOCUMENTS

| | | | | |
|---|---|---|---|---|
| JP | 2019-201742 A | 11/2019 | | |
| WO | WO-2020041558 A1 * | 2/2020 | ........... | A61F 2/2412 |

* cited by examiner

Primary Examiner — Ismael Izaguirre
(74) Attorney, Agent, or Firm — Faegre Drinker Biddle & Reath LLP

(57) ABSTRACT

A sewing system includes: a robot manipulator; a plurality of assemblies attached to and detached from the robot manipulator and each configured to perform predetermined work on cloth; a server stores process data indicating a relationship between a plurality of processes for manufacturing a sewn product from the cloth and the assembly used in each of the plurality of processes; and a control device configured to select an assembly to be mounted to the robot manipulator based on the process data.

14 Claims, 10 Drawing Sheets

FIG.10

| MEANING | PRINT SYMBOLS |
|---|---|
| FOLD LINE | ——— |
| FOLDING CENTER | ▲ |
| ALIGNMENT | ■ |
| ALIGNMENT DIRECTION | □┐ |
| SEWING LINE | - - - - |
| SEWING START POINT | ⋎—● |
| SEWING END POINT | ⌐⋀ |

SEWING SYSTEM

CROSS-REFERENCE TO RELATED APPLICATIONS

The present application claims the benefit of priority of Japanese Patent Application No. 2022-189424, filed on Nov. 28, 2022, the content of which is incorporated herein by reference.

TECHNICAL FIELD

The technology disclosed herein relates to a sewing system.

BACKGROUND ART

In the technical field related to sewing systems, a sewing machine supported by a robot arm, as disclosed in JP2019-201742A, is known.

Sewn products such as clothing are manufactured through a plurality of processes. Conventionally, although dedicated equipment such as sewing machines is used in some processes, most processes are carried out manually. In order to efficiently manufacture sewn products, automation of the process of manufacturing sewn products is required.

SUMMARY

This specification discloses a sewing system. The sewing system includes: a robot manipulator; a plurality of assemblies attached to and detached from the robot manipulator and each configured to perform predetermined work on cloth; a server stores process data indicating a relationship between a plurality of processes for manufacturing a sewn product from the cloth and the assembly used in each of the plurality of processes; and a control device configured to select an assembly to be mounted to the robot manipulator based on the process data.

According to the technology disclosed in this specification, the process of manufacturing sewn products is automated.

BRIEF DESCRIPTION OF DRAWINGS

FIG. 10 is a diagram showing marks and meanings expressed by the marks according to the embodiment.

DESCRIPTION OF EMBODIMENTS

Hereinafter, embodiments will be described with reference to the drawings. In the embodiments, the positional relationship of each part will be described using the terms such as left, right, front, rear, upper, and lower. These terms indicate relative positions or directions with respect to the center of a sewing apparatus 1.

Sewing Apparatus

Figure 1:
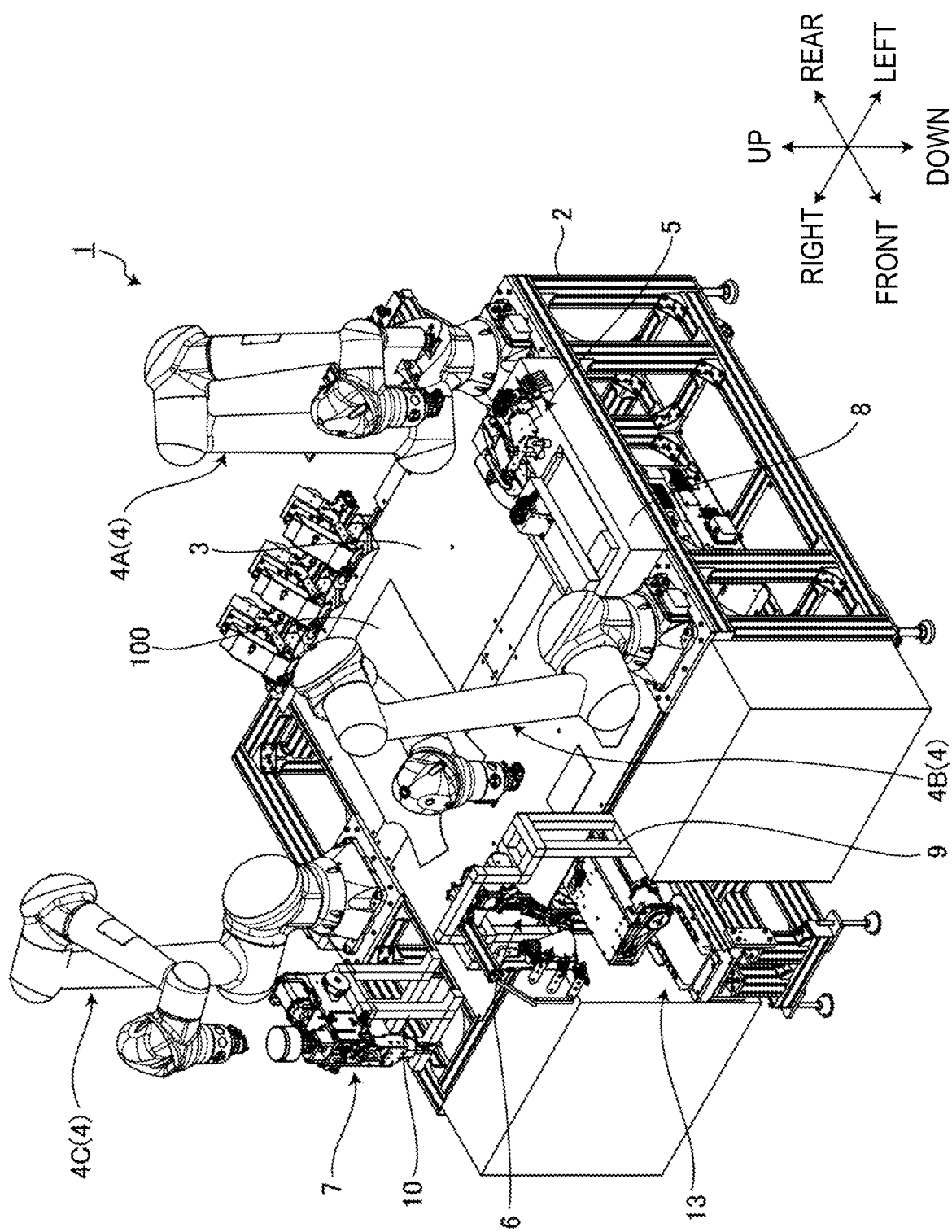
FIG. 1 is a perspective view showing a sewing apparatus according to an embodiment.
Figure 2:
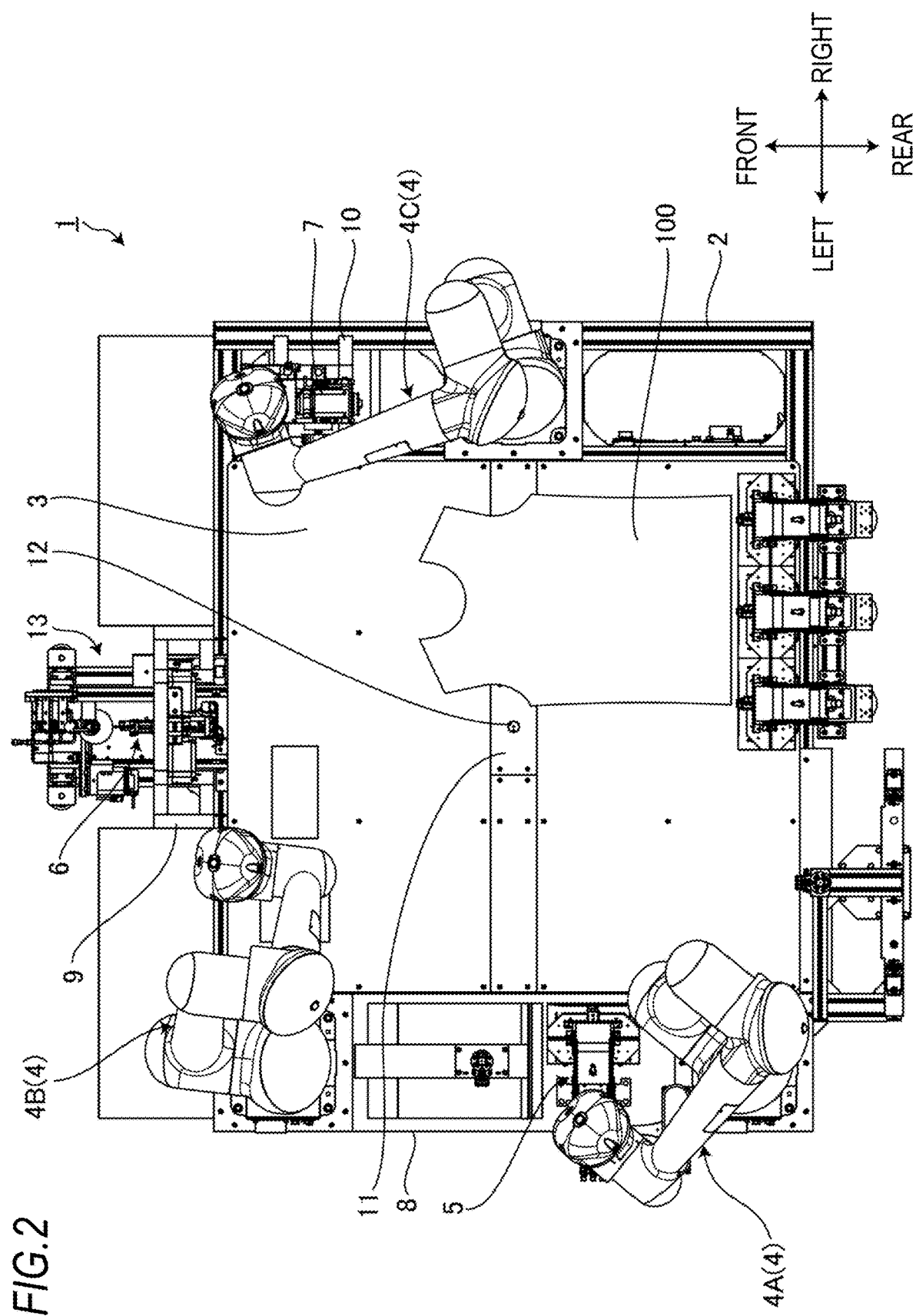
FIG. 2 is a top view showing the sewing apparatus according to the embodiment.

FIG. 1 is a perspective view showing the sewing apparatus 1 according to the embodiment. FIG. 2 is a top view showing the sewing apparatus 1 according to the embodiment. As shown in FIGS. 1 and 2, the sewing apparatus 1 includes a frame 2, a top plate 3, a robot manipulator 4, and a plurality of assemblies (5, 6, 7).

The frame 2 supports each of the top plate 3 and the robot manipulator 4. The top plate 3 has an upper surface that supports cloth. In FIGS. 1 and 2, a front body part 100 made of fabric is described as an example of the cloth. A base end portion of the robot manipulator 4 is fixed to the frame 2 around the top plate 3. Each of the plurality of assemblies (5, 6, 7) is attached to and detached from a tip end portion of the robot manipulator 4. Each of the plurality of assemblies (5, 6, 7) can perform predetermined work on the cloth in a state of being mounted to the tip end portion of the robot manipulator 4.

The robot manipulator 4 includes an articulated robot. In the embodiment, the robot manipulator 4 is a vertically articulated robot. Note that the robot manipulator 4 may be a horizontally articulated robot. The robot manipulator 4 includes a base member, a turning member, a first arm, a second arm, a third arm, a turning actuator, a first revolving actuator, a second revolving actuator, and a third revolving actuator. The base member is fixed to the frame 2. The turning member is turnably supported by the base member. The turning member is supported by the base member to be turnable about a pivot axis extending in the up-down direction. The first arm is revolvably connected to the turning member. The first arm is revolvably connected to the turning member about a first revolving axis. The first revolving axis is orthogonal to an axis parallel to the pivot axis. The second arm is revolvably connected to a tip end portion of the first arm. The second arm is revolvably connected to the first arm about a second revolving axis. The second revolving axis is parallel to the first revolving axis. The third arm is revolvably connected to a tip end portion of the second arm. The third arm is revolvably connected to the second arm about a third revolving axis. The third revolving axis is parallel to the second revolving axis. Any one of a folding assembly 5, a feeding assembly 6, and a sewing machine assembly 7 is mounted to a tip end portion of the third arm. The turning actuator generates power to turn the turning member. The first revolving actuator generates power to revolve the first arm. The second revolving actuator generates power to revolve the second arm. The third revolving actuator generates power to revolve the third arm.

Note that the robot manipulator 4 may not need to be a vertically articulated robot or a horizontally articulated robot. The robot manipulator 4 only needs to be able to move the assemblies (5, 6, 7).

A plurality of robot manipulators 4 are provided. In the embodiment, three robot manipulators 4 are provided. The robot manipulator 4 includes a first robot manipulator 4A, a second robot manipulator 4B, and a third robot manipulator 4C. The structure of the first robot manipulator 4A, the structure of the second robot manipulator 4B, and the structure of the third robot manipulator 4C are substantially the same.

The plurality of assemblies (5, 6, 7) are attached to and detached from the robot manipulator 4. Each of the plurality of assemblies (5, 6, 7) can perform predetermined work on the cloth. In the embodiment, the sewing apparatus 1 includes the folding assembly 5, the feeding assembly 6, and the sewing machine assembly 7 as assemblies. Note that the assemblies provided in the sewing apparatus 1 are not limited to the folding assembly 5, the feeding assembly 6, and the sewing machine assembly 7.

The folding assembly 5 can be attached to and detached from each of a tip end portion of the first robot manipulator 4A, a tip end portion of the second robot manipulator 4B, and a tip end portion of the third robot manipulator 4C. The feeding assembly 6 can be attached to and detached from each of the tip end portion of the first robot manipulator 4A, the tip end portion of the second robot manipulator 4B, and the tip end portion of the third robot manipulator 4C. The sewing machine assembly 7 can be attached to and detached from each of the tip end portion of the first robot manipulator 4A, the tip end portion of the second robot manipulator 4B, and the tip end portion of the third robot manipulator 4C.

The folding assembly 5 performs folding work of creating creases in the cloth. The feeding assembly 6 performs feeding work of feeding the cloth in a predetermined direction when stitching the cloth. The sewing machine assembly 7 performs sewing work of stitching the cloth.

A support stand 8, a suspension member 9, and a suspension member 10 are fixed to the frame 2 around the upper surface of the top plate 3. The folding assembly 5 is supported by the support stand 8 when not mounted to the robot manipulator 4. The feeding assembly 6 is suspended from the suspension member 9 when not mounted to the robot manipulator 4. The sewing machine assembly 7 is suspended from the suspension member 10 when not mounted to the robot manipulator 4.

The top plate 3 includes a throat plate 11. The throat plate 11 is fixed to a center portion of the top plate 3. An opening 12 is provided in the throat plate 11. A shuttle is disposed immediately below the throat plate 11. A bobbin case is housed in the shuttle. The bobbin case holds a bobbin on which the lower thread is wound. The shuttle supplies the lower thread. A shuttle guide mechanism 13 is disposed below the top plate 3. The shuttle is movable between a sewing position immediately below the throat plate 11 and a replacement position in front of the frame 2 while being guided by the shuttle guide mechanism 13. The shuttle can be moved between the sewing position and the replacement position while being guided by the shuttle guide mechanism 13 by the power generated by a shuttle moving actuator. For example, when replacing the bobbin, the shuttle is moved to the replacement position.

Folding Assembly

Figure 3:
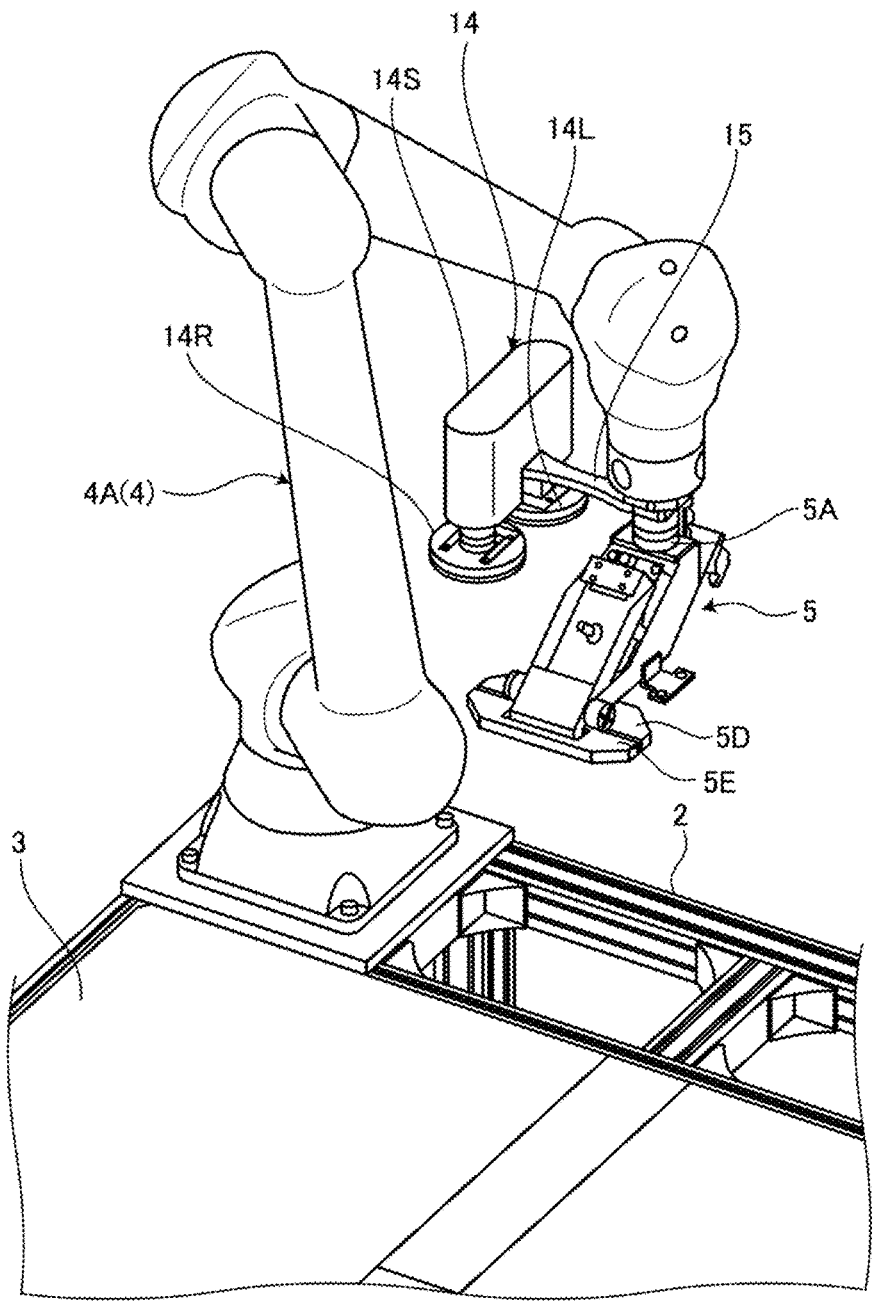
FIG. 3 is a perspective view showing a folding assembly mounted to a tip end portion of a first robot manipulator according to the embodiment.
Figure 3:
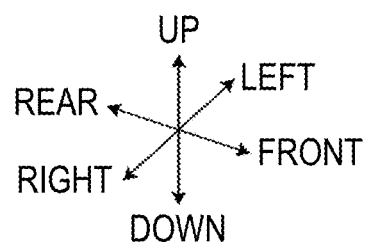

FIG. 3 is a perspective view showing the folding assembly 5 mounted to the tip end portion of the first robot manipulator 4A according to the embodiment. As shown in FIG. 3, the folding assembly 5 is mounted to the tip end portion of the first robot manipulator 4A. The folding assembly 5 has a joint portion 5A connected to the tip end portion of the first robot manipulator 4A. The folding assembly 5 is mounted to the tip end portion of the first robot manipulator 4A via the joint portion 5A. Note that the folding assembly 5 may be mounted to the tip end portion of the second robot manipulator 4B or the tip end portion of the third robot manipulator 4C.

The folding assembly 5 creates creases in the cloth by pinching the cloth from above. The folding assembly 5 has a first hand 5D and a second hand 5E that pinches the cloth between the first hand 5D and the second hand 5E. The second hand 5E moves toward the first hand 5D or away from the first hand 5D by an actuator (not shown). In a state where a part of the cloth is disposed between the first hand 5D and the second hand 5E, the second hand 5E approaches the first hand 5D, thereby creating creases in the cloth.

A camera 14 is attached to the tip end portion of the first robot manipulator 4A. The camera 14 is capable of photographing the cloth. The camera 14 photographs the cloth supported on the top plate 3 from above. The camera 14 includes a main body portion 14S, a first lens 14L, and a second lens 14R. The main body portion 14S includes an image sensor that receives light incident through the first lens 14L and the second lens 14R. The image sensor includes a couple charged device (CCD) image sensor or a complementary metal oxide semiconductor (CMOS) image sensor. The main body portion 14S is fixed to the tip end portion of the first robot manipulator 4A via a connecting member 15. Each of the first lens 14L and the second lens 14R is disposed at a lower portion of the main body portion 14S. The second lens 14R is disposed next to the first lens 14L. Since the camera 14 has the first lens 14L and the second lens 14R, the photographing range of the camera 14 becomes large. Note that the camera 14 including the first lens 14L and the second lens 14R may be a stereo camera.

Feeding Assembly

Figure 4:
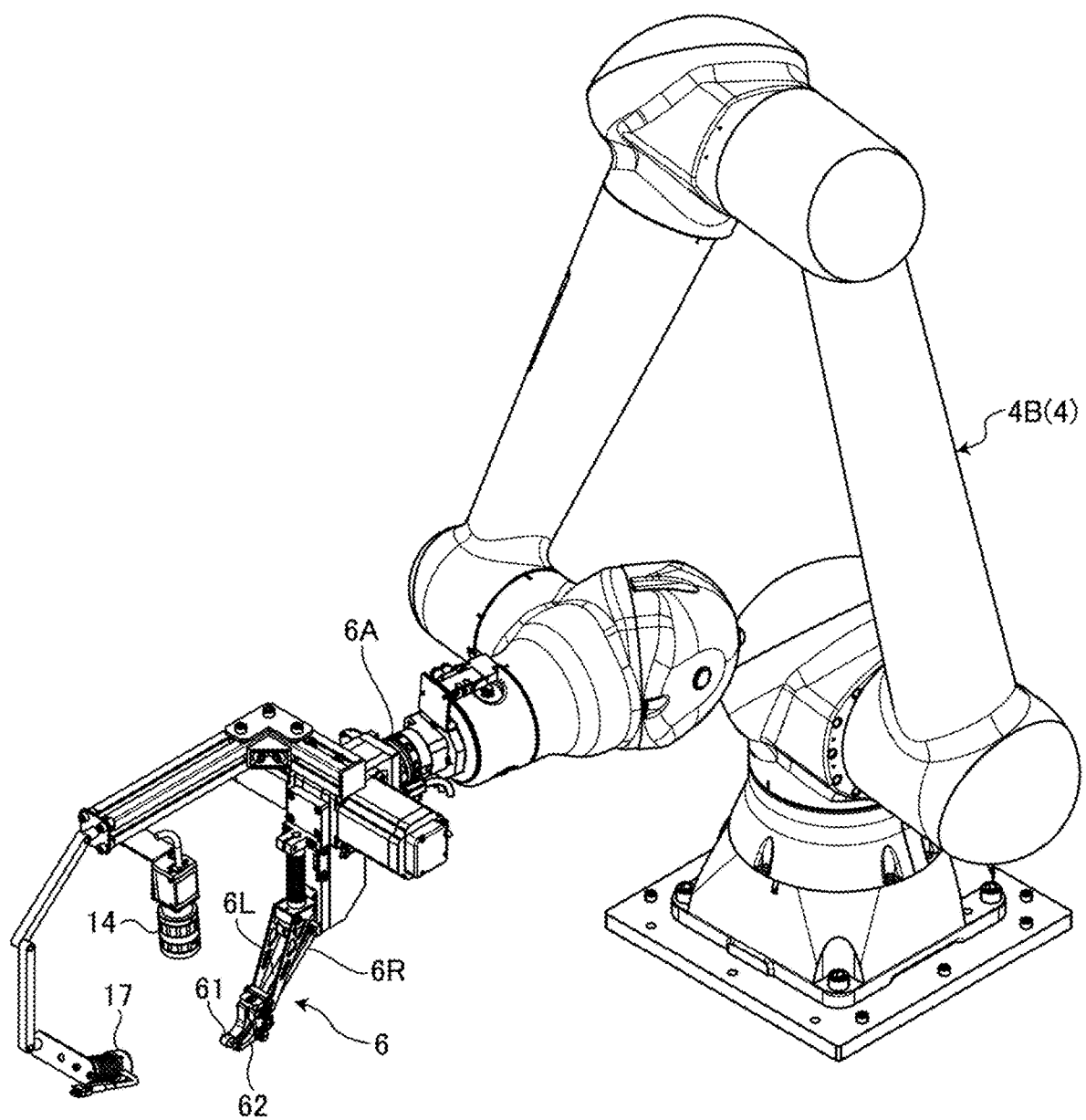
FIG. 4 is a perspective view showing a feeding assembly mounted to a tip end portion of a second robot manipulator according to the embodiment.
Figure 4:
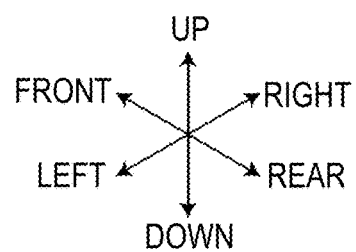

FIG. 4 is a perspective view showing the folding assembly 6 mounted to the tip end portion of the second robot manipulator 4B according to the embodiment. As shown in FIG. 4, the feeding assembly 6 is mounted to the tip end portion of the second robot manipulator 4B. The feeding assembly 6 has a joint portion 6A connected to the tip end portion of the second robot manipulator 4B. The feeding assembly 6 is mounted to the tip end portion of the second robot manipulator 4B via the joint portion 6A. Note that the feeding assembly 6 may be mounted to the tip end portion of the first robot manipulator 4A or the tip end portion of the third robot manipulator 4C.

The feeding assembly 6 includes a first presser 61 and a second presser 62 that press the cloth from above, a first belt 6L supported by the first presser 61, and a second belt 6R supported by the second presser 62. Each of the first belt 6L and the second belt 6R is ring-shaped. Each of the first belt 6L and the second belt 6R is an endless belt. A part of the first belt 6L is disposed between the first presser 61 and the cloth. A part of the second belt 6R is disposed between the second presser 62 and the cloth. Each of the first belt 6L and the second belt 6R is rotated by a feed motor (not shown). The first presser 61 presses the first belt 6L against the cloth. The second presser 62 presses the second belt 6R against the cloth. By rotating each of the first belt 6L and the second belt 6R which are pressed against the cloth, the cloth is fed in a predetermined direction.

In the embodiment, the camera 14 and an illumination device 17 may be attached to the feeding assembly 6. The camera 14 is capable of photographing the cloth. The camera 14 photographs the cloth supported on the top plate 3 from above. The camera 14 attached to the feeding assembly 6 can monitor the cloth being sewn. Marks provided on the cloth may be recognized by the camera 14 while the cloth is being sewn, a sewing trajectory may be calculated, and the feeding speeds of the first belt 6L and the second belt 6R may be controlled in accordance with the trajectory. When the feeding speed of the first belt 6L and the feeding speed of the second belt 6R are the same, the cloth moves linearly. When the feeding speed of the first belt 6L and the feeding speed of the second belt 6R are different, the cloth moves to turn left or right. In this manner, various sewing operations can be performed flexibly using the camera 14.

Sewing Machine Assembly

Figure 5:
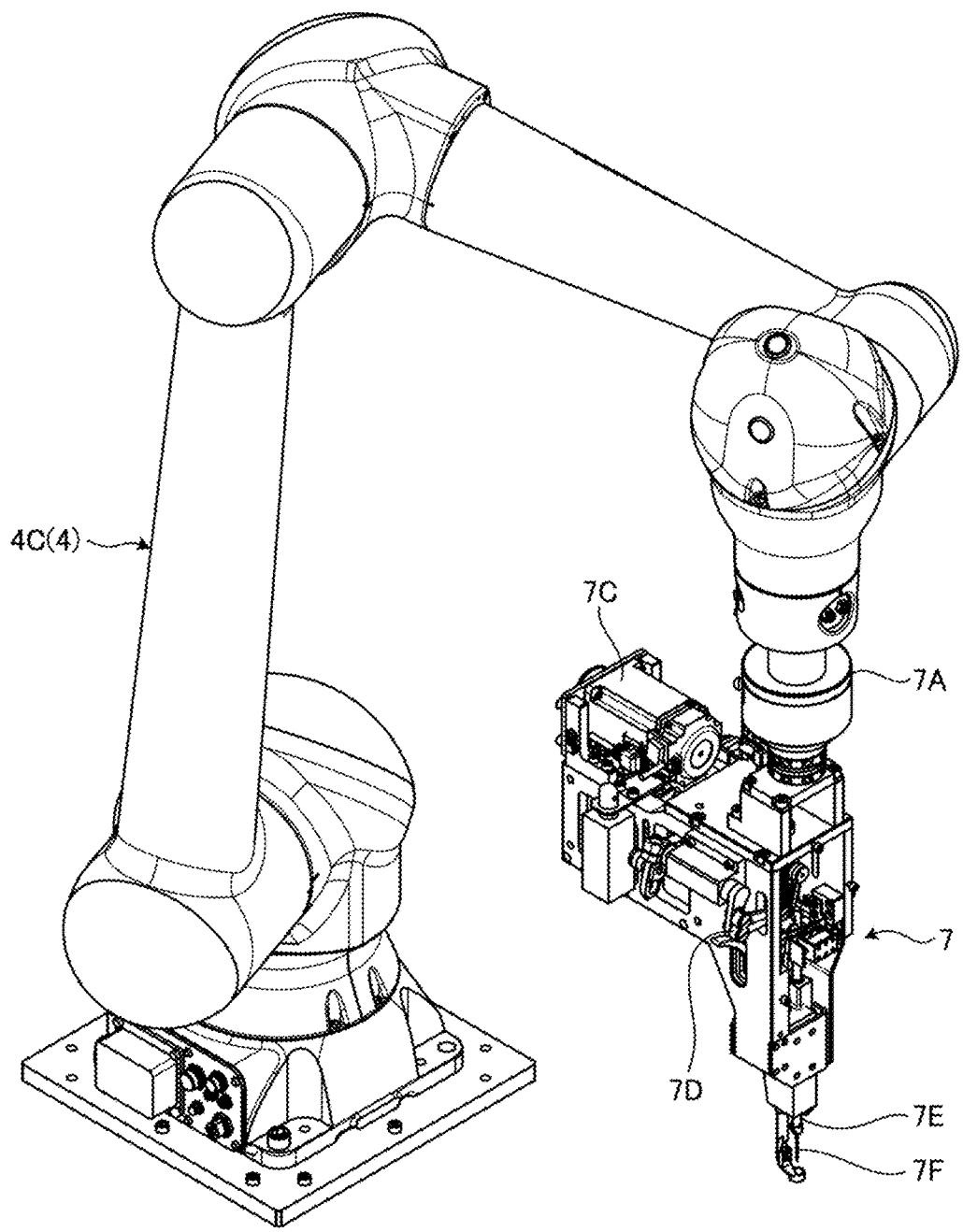
FIG. 5 is a perspective view showing a sewing machine assembly mounted to a tip end portion of a third robot manipulator according to the embodiment.
Figure 5:
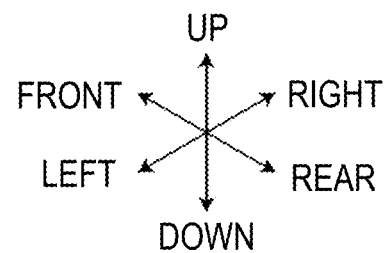

FIG. 5 is a perspective view showing the sewing machine assembly 7 mounted to the tip end portion of the third robot manipulator 4C according to the embodiment. As shown in FIG. 5, the sewing machine assembly 7 is mounted to the tip end portion of the third robot manipulator 4C. The sewing machine assembly 7 has a joint portion 7A connected to the tip end portion of the third robot manipulator 4C. The sewing machine assembly 7 is mounted to the tip end portion of the third robot manipulator 4C via the joint portion 7A. Note that the sewing machine assembly 7 may be mounted to the tip end portion of the first robot manipulator 4A or the tip end portion of the second robot manipulator 4B.

The sewing machine assembly 7 includes a sewing machine motor 7C, a thread take-up lever 7D, and a needle bar 7E. The needle bar 7E holds a sewing machine needle 7F. The sewing machine motor 7C generates power to reciprocate the needle bar 7E in the up-down direction. The thread take-up lever 7D supplies the upper thread to the sewing machine needle 7F. The power generated by the sewing machine motor 7C is transmitted to each of the needle bar 7E and the thread take-up lever 7D via a power transmission mechanism. The needle bar 7E, the thread take-up lever 7D, and the shuttle are interlocked. As the power generated by the sewing machine motor 7C is transmitted to the needle bar 7E, the needle bar 7E and the sewing machine needle 7F held by the needle bar 7E reciprocate in the up-down direction. The power generated by the sewing machine motor 7C is transmitted to the thread take-up lever 7D, and accordingly the thread take-up lever 7D reciprocates in the up-down direction in conjunction with the needle bar 7E. The shuttle rotates in conjunction with the needle bar 7E and the thread take-up lever 7D. The sewing machine needle 7F can pass through the opening 12 of the throat plate 11. The shuttle is disposed immediately below the throat plate 11. By supplying the lower thread, the shuttle forms a seam on the cloth in cooperation with the sewing machine needle 7F. When forming a seam on the cloth, the sewing machine assembly 7 is disposed immediately above the throat plate 11 such that the sewing machine needle 7F passes through the opening 12 of the throat plate 11. When forming a seam on the cloth, the third robot manipulator 4C disposes the sewing machine assembly 7 immediately above the throat plate 11. When forming a seam on the cloth, the feeding assembly 6 is disposed in the vicinity of the sewing machine assembly 7. When forming a seam on the cloth, the second robot manipulator 4B disposes the feeding assembly 6 in the vicinity of the sewing machine assembly 7. While the cloth is being fed in a predetermined direction by the feeding assembly 6, the needle bar 7E of the sewing machine assembly 7 is reciprocated in the up-down direction. The sewing machine assembly 7 performs sewing work in cooperation with the shuttle. The sewing machine assembly 7 forms a seam on the cloth by cooperation between the shuttle and the sewing machine needle 7F held by the needle bar 7E.

As described with reference to FIGS. 3 and 4, the camera 14 is attached to the tip end portion of the first robot manipulator 4A to which the folding assembly 5 is mounted, and to the feeding assembly 6, respectively. The camera 14 may be attached to the tip end portion of the second robot manipulator 4B to which the feeding assembly 6 is mounted. The camera 14 may be attached to the tip end portion of the third robot manipulator 4C to which the sewing machine assembly 7 is mounted. The camera 14 may be attached to the folding assembly 5 or the sewing machine assembly 7. In the following description, the camera 14 attached to the first robot manipulator 4A will be appropriately referred to as a first camera 14A, the camera 14 attached to the second robot manipulator 4B will be appropriately referred to as a second camera 14B, and the camera 14 attached to the third robot manipulator 4C is appropriately referred to as a third camera 14C.

Sewing System

Figure 6:
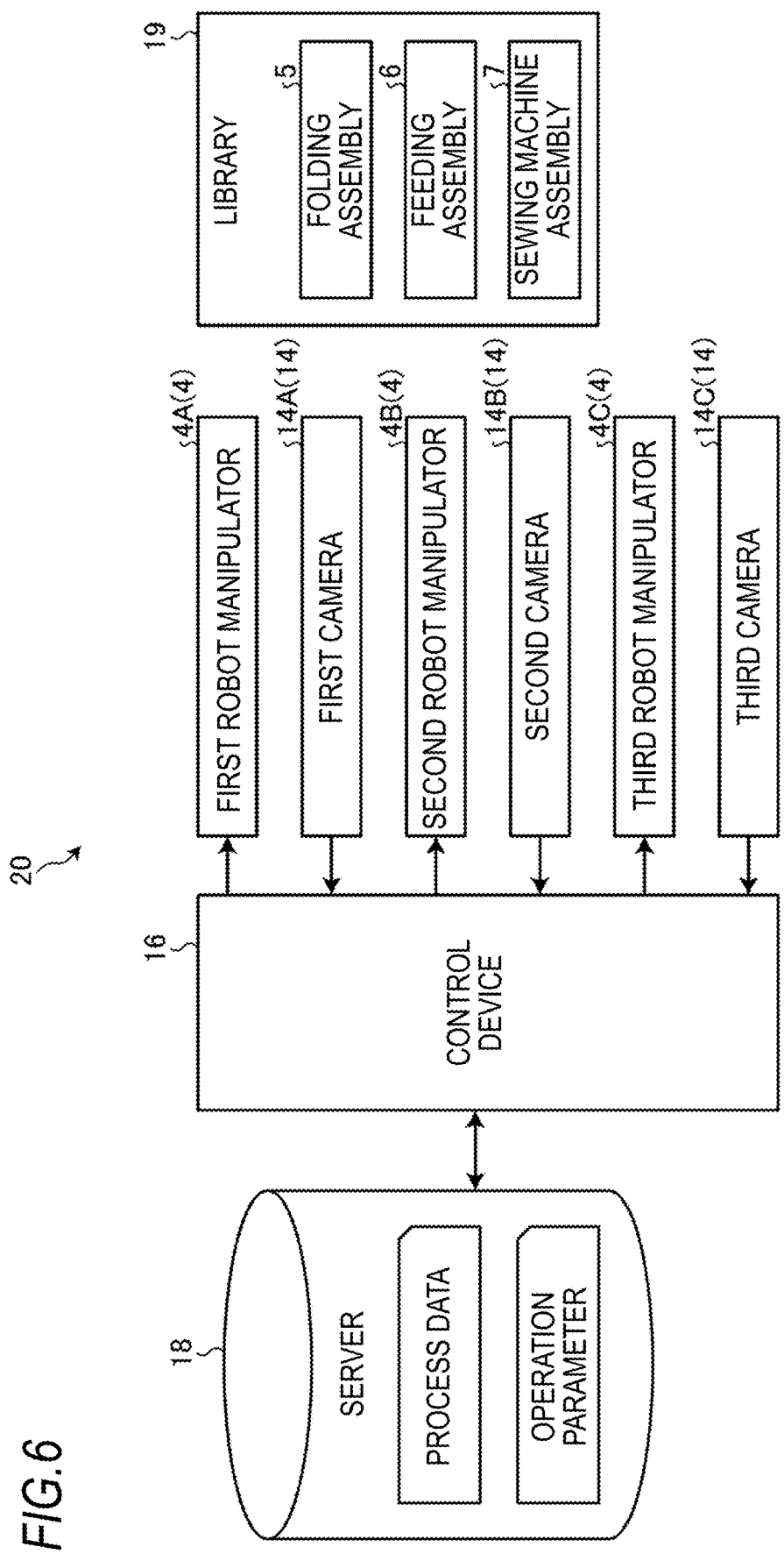
FIG. 6 is a block diagram showing a sewing system according to the embodiment.

FIG. 6 is a block diagram showing a sewing system 20 according to the embodiment. The sewing system 20 includes a server 18, a control device 16, the plurality of robot manipulators 4 (4A, 4B, 4C), the camera 14 (14A, 14B, 14C) attached to each of the plurality of robot manipulators 4, and a library 19 that holds the plurality of assemblies (5, 6, 7).

The control device 16 is provided in the sewing apparatus 1. One control device 16 is provided for one sewing apparatus 1. The control device 16 controls the robot manipulator 4. The control device 16 controls the assembly (5, 6, 7) mounted to the robot manipulator 4. The control device 16 controls the shuttle. The control device 16 includes a computer system. The control device 16 includes a processor, such as a central processing unit (CPU); a memory such as a read only memory (ROM) or a random access memory (RAM); and an input/output interface including input/output circuits that can input and output signals and data.

The library 19 is provided in the sewing apparatus 1. One library 19 is provided for one sewing apparatus 1. The robot manipulator 4 can approach the library 19 and mount a predetermined assembly held by the library 19, or can cause the library 19 to hold an assembly that was removed from the robot manipulator 4. In the embodiment, the library 19 includes the support stand 8, the suspension member 9, and the suspension member 10 as described above.

When mounting the folding assembly 5 to the tip end portion of the robot manipulator 4, the control device 16 controls the robot manipulator 4 such that the tip end portion of the robot manipulator 4 approaches the folding assembly 5 supported by the support stand 8. The folding assembly 5 is mounted to the robot manipulator 4 by connecting the joint portion 5A of the folding assembly 5 supported by the support stand 8 to the tip end portion of the robot manipulator 4. When removing the folding assembly 5 from the tip end portion of the robot manipulator 4, the control device 16 controls the robot manipulator 4 such that the folding assembly 5 mounted to the tip end portion of the robot manipulator 4 approaches the support stand 8. After the folding assembly 5 is supported by the support stand 8, the connection between the tip end portion of the robot manipulator 4 and the joint portion 5A of the folding assembly 5 is released.

When mounting the feeding assembly 6 to the tip end portion of the robot manipulator 4, the control device 16 controls the robot manipulator 4 such that the tip end portion of the robot manipulator 4 approaches the feeding assembly 6 suspended from the suspension member 9. The feeding assembly 6 is mounted to the robot manipulator 4 by connecting the joint portion 6A of the feeding assembly 6 suspended by the suspension member 9 to the tip end portion of the robot manipulator 4. When removing the feeding assembly 6 from the tip end portion of the robot manipulator 4, the control device 16 controls the robot manipulator 4 such that the feeding assembly 6 mounted to the tip end portion of the robot manipulator 4 approaches the suspension member 9. After the feeding assembly 6 is suspended from the suspension member 9, the connection between the tip end portion of the robot manipulator 4 and the joint portion 6A of the feeding assembly 6 is released.

When mounting the sewing machine assembly 7 to the tip end portion of the robot manipulator 4, the control device 16 controls the robot manipulator 4 such that the tip end portion of the robot manipulator 4 approaches the sewing machine assembly 7 suspended from the suspension member 10. The sewing machine assembly 7 is mounted to the robot manipulator 4 by connecting the joint portion 7A of the sewing machine assembly 7 suspended by the suspension member 10 to the tip end portion of the robot manipulator 4. When removing the sewing machine assembly 7 from the tip end portion of the robot manipulator 4, the control device 16 controls the robot manipulator 4 such that the sewing machine assembly 7 mounted to the tip end portion of the robot manipulator 4 approaches the suspension member 10. After the sewing machine assembly 7 is suspended from the suspension member 10, the connection between the tip end portion of the robot manipulator 4 and the joint portion 7A of the sewing machine assembly 7 is released.

Note that, in the library 19, the folding assembly 5 does not need to be supported by the support stand 8. The feeding assembly 6 does not need to be suspended from the suspension member 9. The sewing machine assembly 7 does not need to be suspended from the suspension member 10. The holding forms of the assemblies (5, 6, 7) in the library 19 may be any form. It is only necessary that the robot manipulator 4 be able to mount a predetermined assembly in the library 19 or to cause the library 19 to hold an assembly that was removed from the robot manipulator 4. Further, one library 19 may not be provided in one sewing apparatus 1. For example, a plurality of sewing apparatuses 1 may share one library 19.

The server 18 is an FTP server. The server 18 sends and receives data (files) to and from the control device 16 using the FTP protocol. The server 18 can send and receive data to and from each of the plurality of control devices 16 (sewing apparatuses 1). The control device 16 corresponds to an FTP client. The sewing apparatus 1 including the control device 16 is disposed in a sewing factory. The server 18 may be disposed at the sewing factory or at a remote location from the sewing factory.

The server 18 stores process data. The process data refers to data indicating a relationship between a plurality of processes for manufacturing a sewn product from cloth and assemblies used in each of the plurality of processes. The process data describes the order of the plurality of processes and the assemblies used in each of the plurality of processes.

As an example, the process data describes, as the process for manufacturing a sewn product from cloth, a pick-up process in which pick-up work of picking up the cloth from the cloth storage table and placing the cloth on the upper surface of the top plate 3 is performed; a folding process in which folding work of creating creases in the cloth is performed; and a sewing process in which sewing work of stitching the cloth is performed. Further, the process data describes the order of the processes in which the folding process is performed after the pick-up process, and the sewing process is performed after the folding process. The process data also describes, as assemblies used in each of the plurality of processes, a pick-up assembly (not shown) is used in the pick-up process, the folding assembly 5 is used in the folding process, the feeding assembly 6 and the sewing machine assembly 7 are used in the sewing process.

The server 18 also stores operation parameters. The operation parameters refer to the operating conditions of the robot manipulator 4 for each process. Note that the operation parameters may include operating conditions of the assemblies (5, 6, 7) for each process.

As an example, the operation parameters of the robot manipulator 4 in the pick-up process include an origin position defined for the robot manipulator 4, a movement amount from the origin position to the library 19 for mounting the pick-up assembly held in the library 19 on the robot manipulator 4, a movement amount for bringing the pick-up assembly mounted to the robot manipulator 4 closer to the cloth storage table, and a movement amount required to place the cloth picked up by the pick-up assembly on the cloth storage table at a target position on the top plate 3.

The operation parameters of the robot manipulator 4 in the folding process include an origin position defined for the robot manipulator 4, a movement amount from the origin position to the library 19 for mounting the folding assembly 5 held by the library 19 to the robot manipulator 4, a movement amount for bringing the folding assembly 5 mounted to the robot manipulator 4 closer to the cloth supported on the upper surface of the top plate 3, and a position of the folding assembly 5 for pinching the target part of the cloth to be creased with the first hand 5D and the second hand 5E.

The operation parameters of the robot manipulator 4 in the sewing process include the origin position defined for the robot manipulator 4, a movement amount from the origin position to the library 19 for mounting the feeding assembly 6 held by the library 19 to the robot manipulator 4, a movement amount for bringing the feeding assembly 6 mounted to the robot manipulator 4 closer to the cloth supported on the upper surface of the top plate 3, and a position of the feeding assembly 6 for pressing a predetermined part of the cloth with the first presser 61 and the second presser 62. In addition, the operation parameters of the robot manipulator 4 in the sewing process include the origin position defined for the robot manipulator 4, the movement amount from the origin position to the library 19 for mounting the sewing machine assembly 7 held by the library 19 to the robot manipulator 4, the movement amount for bringing the sewing machine assembly 7 mounted to the robot manipulator 4 closer to the cloth supported on the upper surface of the top plate 3, and the position of the sewing machine assembly 7 for piercing a predetermined part of the cloth with the sewing machine needle 7F.

The control device 16 acquires the process data and the operation parameters from the server 18 when the sewing apparatus 1 manufactures a sewn product from cloth. The control device 16 selects the assemblies (5, 6, 7) to be mounted to the robot manipulator 4 based on the process data. Based on the process data and operation parameters, the control device 16 brings the robot manipulator 4 closer to the library 19 and then mounts the selected assemblies (5, 6, 7) to the robot manipulator 4 in the library 19. After the assemblies (5, 6, 7) are mounted to the robot manipulator 4, the control device 16 controls the robot manipulator 4 and the assemblies (5, 6, 7) mounted to the robot manipulator 4 based on the process data and operation parameters.

Note that not all operations of the robot manipulator 4 for a process are defined in advance, and a process of calculating the previous robot control amount may be included. Examples of the process of calculating the robot control amount includes "a process of photographing a folding position marker of the cloth with a camera, recognizing the position thereof, and calculating a robot operation to move the folding assembly 5 to the folding position", and "a process of photographing the mark of the target (cloth) with a camera, recognizing a mark disposition state, and constructing sewing conditions from the mark arrangement state". A rough operation of the robot manipulator 4 may be defined in advance, and an operation of the robot manipulator 4 related to tool control may be calculated each time based on the target state (cloth state). Thereby, the robot manipulator 4 can operate precisely depending on the type and condition of the target.

In the embodiment, marks are provided on the cloth. The marks provided on the cloth are photographed by the camera 14. The control device 16 determines the work contents of the assemblies (5, 6, 7) in each of the plurality of processes based on the image data of the marks acquired by the camera 14, and controls the assemblies (5, 6, 7) based on the determined work contents.

Figure 7:
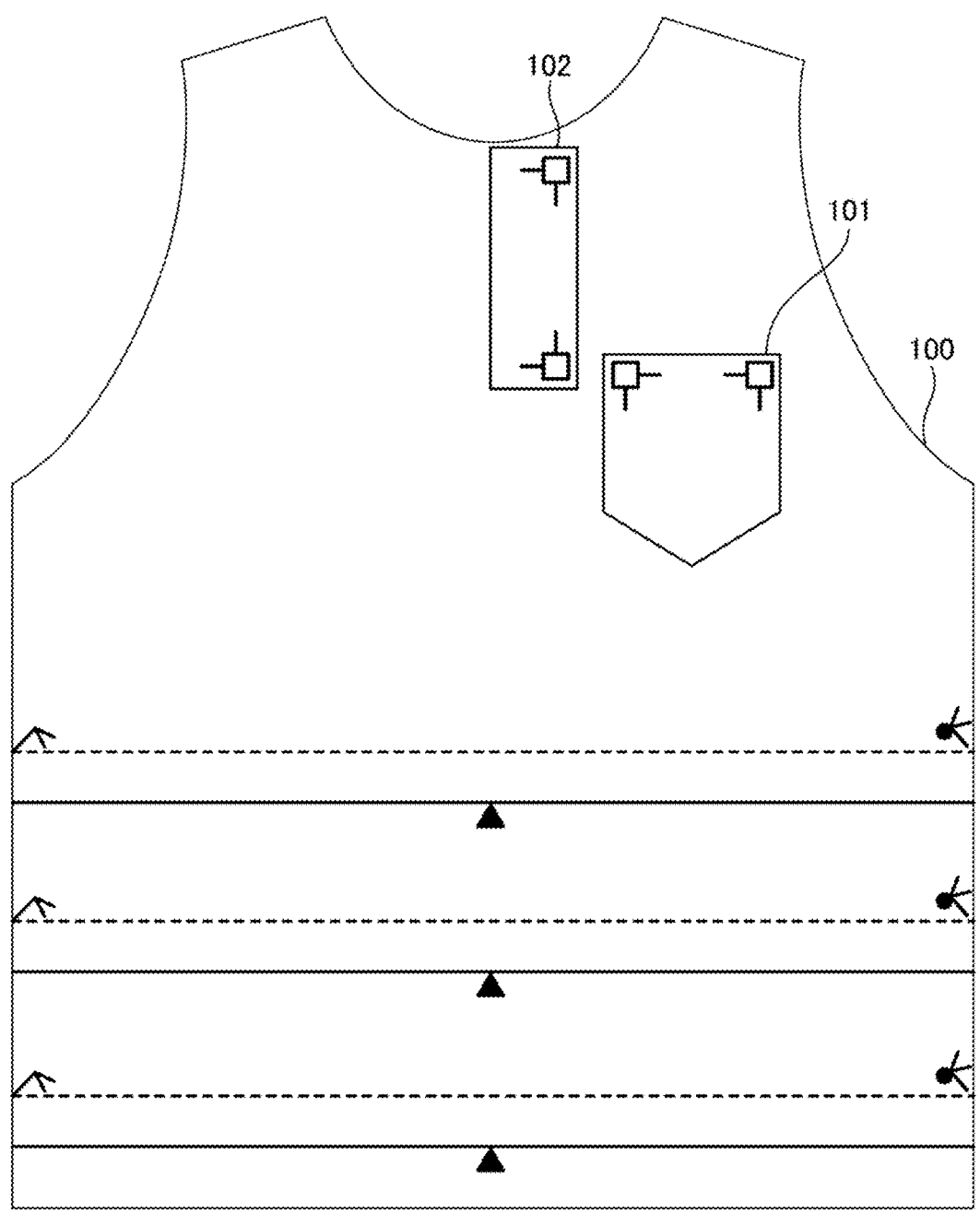
FIG. 7 is a view showing cloth provided with marks according to the embodiment.

FIG. 7 is a view showing cloth provided with marks according to the embodiment. In the example shown in FIG. 7, the cloth includes the front body part 100, a pocket 101 sewn to the front body part 100, and a placket 102 sewn to the front body part 100.

Figure 8:
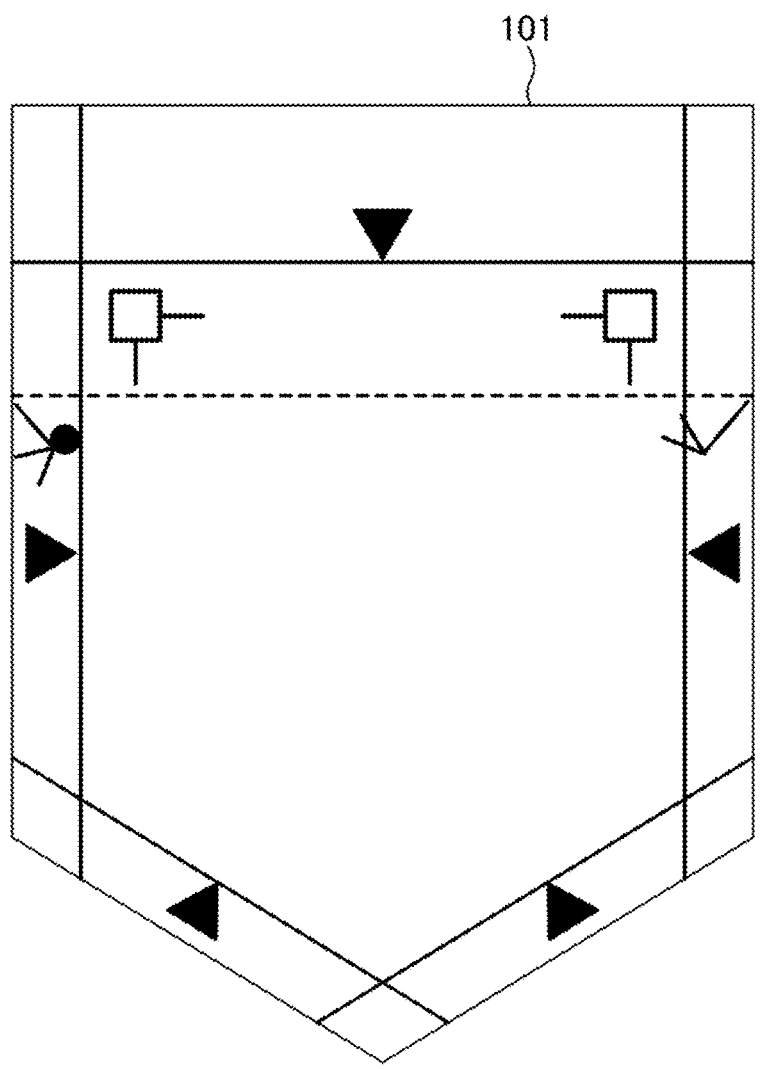
FIG. 8 is a view showing a pocket before being sewn to a front body part according to the embodiment.
Figure 9:
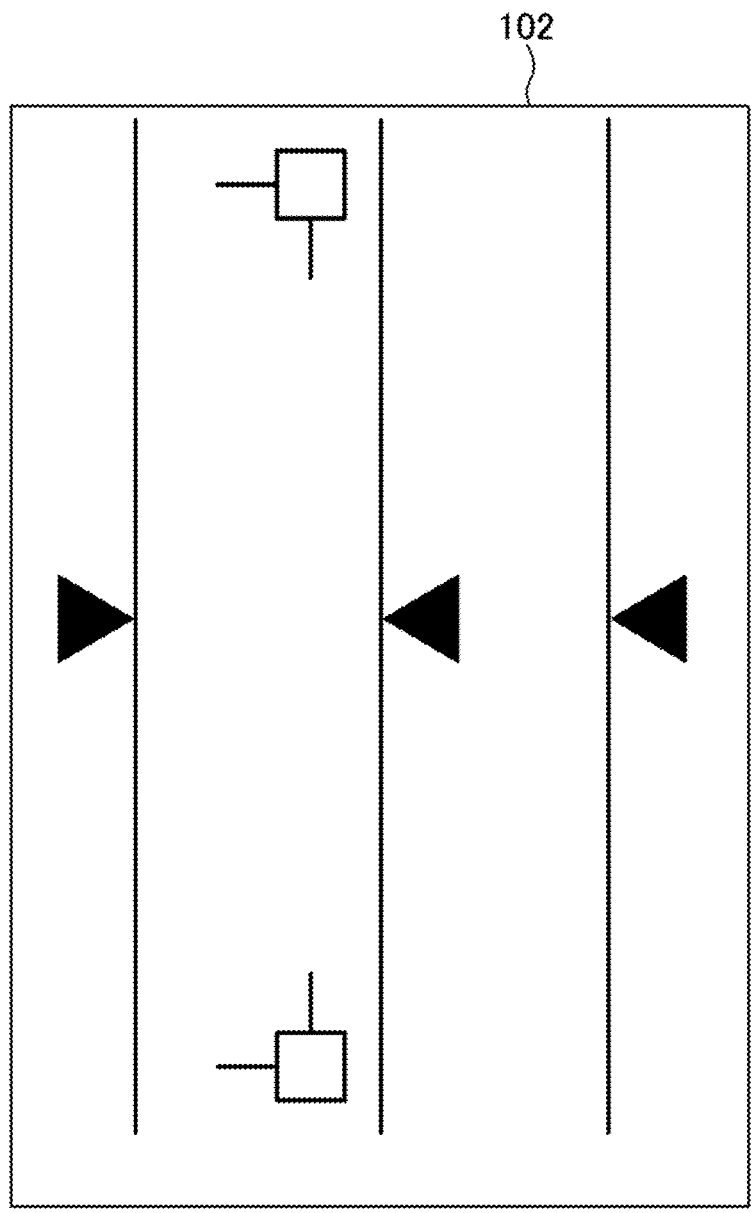
FIG. 9 is a view showing a placket before being sewn to the front body part according to the embodiment.

FIG. 8 is a view showing the pocket 101 before being sewn to the front body part 100 according to the embodiment. FIG. 9 is a view showing the placket 102 before being sewn to the front body part 100 according to the embodiment. FIG. 10 is a diagram showing marks (print symbols) and meanings expressed by the marks according to the embodiment.

As shown in FIG. 10, a plurality of types of marks are prepared in advance. A predetermined mark among the plurality of types of marks is placed on the cloth.

In the example shown in FIG. 10, one solid line mark means a fold line. The filled triangular mark means a folding center. The cloth is creased along the fold line around the folding center.

A filled rectangular mark means alignment. A mark consisting of a white square and two solid lines extending from the square means the alignment direction. The cloth is aligned using the alignment or the alignment direction.

A single broken line mark means a sewing line. A mark consisting of a filled circle and two solid lines extending from the circle means a sewing start point. A mark consisting of three solid lines means the sewing end point. The cloth is stitched along the sewing line from the sewing start point to the sewing end point.

As shown in FIG. 8, the pocket 101 has a mark indicating a fold line, a mark indicating a folding center, a mark indicating an alignment direction, a mark indicating a sewing start point, a mark indicating a sewing line, and a mark indicating a sewing end point.

Before sewing the pocket 101 to the front body part 100, the control device 16 performs the folding work of creating creases in the pocket 101 using the folding assembly 5. The folding work of creating creases in the pocket 101 is performed on the upper surface of the top plate 3. The pocket 101 is installed in advance on the upper surface of the top plate 3 by the pick-up assembly.

In order to crease the pocket 101, the control device 16 mounts the folding assembly 5 to, for example, the first robot manipulator 4A based on the process data. The control device 16 photographs the mark provided on the pocket 101 with the first camera 14A attached to the first robot manipulator 4A. The control device 16 processes the image data of the mark provided on the pocket 101 acquired by the first camera 14A, determines the type of the mark provided on the pocket 101, and calculates the position of the mark.

In the embodiment, the control device 16 determines the types of the mark indicating the fold line and the mark indicating the folding center provided in the pocket 101, and calculates the positions of the mark indicating the fold line and the mark indicating the folding center. The control device 16 determines the work content of the folding assembly 5 based on the type and position of the mark indicating the fold line and the mark indicating the folding center provided in the pocket 101. The control device 16 determines, as work content of the folding assembly 5, to crease the pocket 101 along the fold line around the folding center. The control device 16 controls the folding assembly 5 to create creases in the pocket 101 along the fold line around the folding center based on the type and position of the mark indicating the fold line and the mark indicating the folding center, which are provided on the pocket 101.

After the pocket 101 is creased, placement work of placing the creased pocket 101 on the front body part 100 is performed. Based on the operation parameters, the control device 16 picks up the creased pocket 101, for example with the folding assembly 5, and places the pocket 101 on the front body part 100 supported on the upper surface of the top plate 3. The placement work of placing the pocket 101 on the front body part 100 is performed on the upper surface of the top plate 3. The front body part 100 is installed in advance on the upper surface of the top plate 3 by the pick-up assembly. The control device 16 determines the type of mark indicating the alignment direction provided on the pocket 101, which is acquired by the first camera 14A, and calculates the position of the mark indicating the alignment direction. The control device 16 positions the pocket 101 with respect to the front body part 100 based on the type and position of the mark indicating the alignment direction provided on the pocket 101. The control device 16 controls the first robot manipulator 4A and the folding assembly 5 such that the pocket 101 is placed at the target part of the front body part 100 based on the type and position of the mark indicating the alignment direction provided on the pocket 101.

Note that the placement work may be performed not by the folding assembly 5 but by a placing assembly (not shown) that can pick up the pocket 101.

After the pocket 101 is placed at the target part of the front body part 100, the control device 16 mounts the feeding assembly 6 to, for example, the second robot manipulator 4B and mounts the sewing machine assembly 7 to the third robot manipulator 4C based on the process data in order to sew the pocket 101 to the front body part 100. The control device 16 photographs the mark provided in the pocket 101 using at least one of the second camera 14B attached to the second robot manipulator 4B and the third camera 14C attached to the third robot manipulator 4C. The control device 16 processes the image data of the mark provided on the pocket 101 acquired by the camera 14 (14B, 14C), determines the type of the mark provided on the pocket 101, and calculates the position of the mark.

In the embodiment, the control device 16 determines the types of the mark indicating a sewing start point, the mark indicating a sewing line, and the mark indicating a sewing end point, which are provided on the pocket 101, and calculates the positions of the mark indicating a sewing start point, the mark indicating a sewing line, and the mark indicating a sewing end point. The control device 16 determines the work contents of the feeding assembly 6 and the sewing machine assembly 7 based on the type and position of the mark indicating the sewing start point, the mark indicating the sewing line, and the mark indicating the sewing end point, which are provided on the pocket 101. The control device 16 determines that the work contents of the feeding assembly 6 and the sewing machine assembly 7 is to perform stitching along the sewing line from the sewing start point to the sewing end point. The control device 16 controls the feeding assembly 6 and the sewing machine assembly 7 to perform stitching along the sewing line from the sewing start point to the sewing end point based on the type and position of the mark indicating the sewing start point, the mark indicating the sewing line, and the mark indicating the sewing end point, which are provided on the pocket 101. By stitching the pocket 101, the pocket 101 is sewn to the front body part 100, as shown in FIG. 8.

Similarly to the pocket 101, the placket 102 is sewn to the front body part 100. As shown in FIG. 9, a plurality of marks are provided on the placket 102. The control device 16 determines, based on the image data of the marks acquired by the camera 14, the work content of the folding assembly 5 for creating creases on the placket 102, the work content of the folding assembly 5 for placing the creased placket 102 on the front body part 100, and the work contents of the feeding assembly 6 and the sewing machine assembly 7 for sewing the placket 102 to the front body part 100, and controls, based on the determined work contents, each of the plurality of assemblies (5, 6, 7). By stitching the placket 102, the pocket 102 is sewn to the front body part 100, as shown in FIG. 8. Note that, as shown in FIG. 8, marks may be provided on the front body part 100.

In the embodiment, the marks are formed of a material that does not reflect visible light. The marks are formed of a material that reflects ultraviolet light. The marks may be provided on the cloth using transparent fluorescent ink that generates visible light when irradiated with ultraviolet light. When photographing a mark with the camera 14, an ultraviolet ray irradiation device (not shown) irradiates the cloth with ultraviolet light. Since the marks are made visible by being irradiated with ultraviolet light, the camera 14 can photograph the marks. In addition, in a case where the cloth contains a fluorescent whitening agent, when the cloth is irradiated with ultraviolet light, there is a possibility that the cloth will emit blue light. In a case where the cloth is irradiated with ultraviolet light, even when the cloth emits blue light, in order to be capable of distinguishing the mark from the cloth, the mark may be formed with an ink that emits, for example, red light upon irradiation with ultraviolet light. Furthermore, when photographing a mark with the camera 14, a wavelength selection filter that cuts blue light may be disposed on the light incident surface side of the first lens 14L and the second lens 14R.

Effects

As described above, in the embodiment, the sewing system 20 includes the robot manipulator 4, the plurality of assemblies (5, 6, 7) that are attached to and detached from the robot manipulator 4 and each capable of performing predetermined work on the cloth, the server 18 that stores process data indicating the relationship between a plurality of processes for manufacturing sewn products from the cloth and the assemblies (5, 6, 7) used in each of the plurality of processes, and the control device 16 that selects the assemblies (5, 6, 7) to be mounted to the robot manipulator 4 and controls the robot manipulator 4 and the assemblies (5, 6, 7) mounted to the robot manipulator 4, based on the process data.

According to the embodiment, the assemblies (5, 6, 7) to be used in the process for manufacturing the sewn product are selected based on predetermined process data, and the selected assemblies (5, 6, 7) are mounted to the robot manipulator 4. The assemblies (5, 6, 7) mounted to the robot manipulator 4 are controlled based on the process data. As a result, the process of manufacturing sewn products is automated, and sewn products can be manufactured efficiently.

A plurality of robot manipulators 4 are provided. Thereby, the control device 16 can perform the work by the second assembly mounted to the second robot manipulator 4 in parallel with the work by the first assembly attached to the first robot manipulator 4, for example. Therefore, sewn products can be manufactured efficiently.

The server 18 stores not only process data but also operation parameters indicating operating conditions of the robot manipulator 4 for each process. The control device 16 controls the robot manipulator 4 based on the operation parameters. The control device 16 can sequentially control the robot manipulator 4 based on predetermined operation parameters. Therefore, the process of manufacturing sewn products is automated.

The sewing system 20 includes the camera 14 that photographs marks provided on the cloth. The control device 16 determines the work contents of the assemblies (5, 6, 7) based on the image data of the marks acquired by the camera 14, and controls the assemblies (5, 6, 7) based on the determined work contents. Thereby, the control device 16 can determine the work contents of the assemblies (5, 6, 7) for each cloth. Further, since the server 18 or the control device 16 does not need to store detailed work contents determined for each cloth, the load on the server 18 or the control device 16 is reduced.

The control device 16 positions the cloth based on the image data of the mark. The marks are not barcodes (one-dimensional barcodes or two-dimensional barcodes), but are composed of basic figures such as triangles, squares, circles, solid lines, and broken lines. Since the marks are composed of basic figures, the control device 16 can position (align) the cloth based on the image data of the marks.

The mark is formed of a material that does not reflect visible light. The marks are formed of, for example, a material that reflects ultraviolet light. In the process of manufacturing sewn products, the marks are made visible by irradiating the marks with ultraviolet light, and thus the marks can be used effectively. Even when the mark is not erased after the sewn product is completed, the mark will not become visible unless the mark is irradiated with ultraviolet light. Therefore, even when sewn products are available in the market, the mark is not visible when the sewn products are on the market.

Other Embodiments

Note that the mark may be formed of a material that reflects visible light. For example, when the mark is formed of a water-soluble material, the mark will disappear when the sewn product is washed after the sewn product is completed. When the mark comes off when washed, the mark will not be visible when the sewn products are on the market even when the sewn products are available in the market. Further, after the mark is imaged by the camera 14 in the manufacturing process of the sewn product, the cloth may be sewn such that the mark is hidden. That is, once the mark fulfills its role in the sewing product manufacturing process, the sewn product may be completed such that the mark is hidden inside. Since the mark is hidden inside the sewn product, the mark is not visible when the sewn products are on the market.

The invention claimed is:

1. A sewing system comprising:
a robot manipulator;
a plurality of assemblies attached to and detached from the robot manipulator and each configured to perform predetermined work on cloth;
a server stores process data indicating a relationship between a plurality of processes for manufacturing a sewn product from the cloth and the assembly used in each of the plurality of processes; and
a control device configured to select an assembly to be mounted to the robot manipulator based on the process data, wherein
a base end portion of the robot manipulator is fixed to a frame.

2. The sewing system according to claim 1, wherein the control device controls the robot manipulator.

3. The sewing system according to claim 2, wherein the control device controls the assembly mounted to the robot manipulator.

4. The sewing system according to claim 1, wherein a plurality of the robot manipulators are provided.

5. The sewing system according to claim 2, wherein the server stores operation parameters of the robot manipulator for each of the processes, and
the control device controls the robot manipulator based on the operation parameters.

6. The sewing system according to claim 3, wherein the assembly includes a folding assembly that performs folding work of creating creases on the cloth, a feeding assembly that performs feeding work of feeding the cloth when stitching the cloth, and a sewing machine assembly that performs sewing work of stitching the cloth.

7. The sewing system according to claim 6, wherein the sewing machine assembly performs the sewing work in cooperation with a shuttle, and
the control device controls the shuttle.

8. The sewing system according to claim 3, further comprising:
a camera that photographs marks provided on the cloth, wherein
the control device determines the work content of the assembly based on image data of the mark acquired by the camera, and controls the assembly based on the work content.

9. The sewing system according to claim 8, wherein the control device positions the cloth based on the image data of the mark.

10. The sewing system according to claim 8, wherein the mark is formed of a material that does not reflect visible light.

11. The sewing system according to claim 8, wherein the mark is formed of a material that reflects ultraviolet light.

12. The sewing system according to claim 8, wherein the mark is formed of a material that reflects visible light.

13. The sewing system according to claim 12, wherein the mark is formed of a water-soluble material.

14. The sewing system according to claim 12, wherein after the mark is photographed by the camera, the cloth is sewn such that the mark is hidden.

* * * * *